PHOTOCOMPOSING APPARATUS

Filed June 4, 1951 3 Sheets-Sheet 1

INVENTORS
RENÉ A. HIGONNET
AND LOUIS M. MOYROUD
BY Kenway Jenney Witter & Hildreth
ATTORNEYS INVENTORS
RENÉ A. HIGONNET
AND LOUIS M. MOYROUD
BY Kenway Jenney Witter & Hildreth
ATTORNEYS April 2, 1957 R. A. HIGONNET ET AL 2,787,199

PHOTOCOMPOSING APPARATUS

Filed June 4, 1951 3 Sheets-Sheet 3

INVENTORS
RENÉ A. HIGONNET
AND LOUIS M. MOYROUD
BY Kenway Jenney Witter & Hildreth
ATTORNEYS United States Patent Office 2,787,199

Patented Apr. 2, 1957

2,787,199

PHOTOCOMPOSING APPARATUS

René A. Higonnet and Louis M. Moyroud, Cambridge, Mass., assignors to Graphic Arts Research Foundation, Inc., Cambridge, Mass., a corporation of Delaware Application June 4, 1951, Serial No. 229,804

Claims priority, application France June 6, 1950

1 Claim. (Cl. 95—4.5)

The present invention relates to improvements in photographic type composing machines, and more particularly to improvements in the coding mechanism, the mechanism for changing the style and size of characters, the decoding mechanism, and an indicating or layout device on which the operator can follow the composition of a page. The invention is concerned especially with improvements in the photocomposing apparatus shown in our prior applications, as for example, Serial No. 770,320 filed August 23, 1947, and Serial No. 187,752, filed September 30, 1950, now Patent No. 2,664,986.

Figure 1:
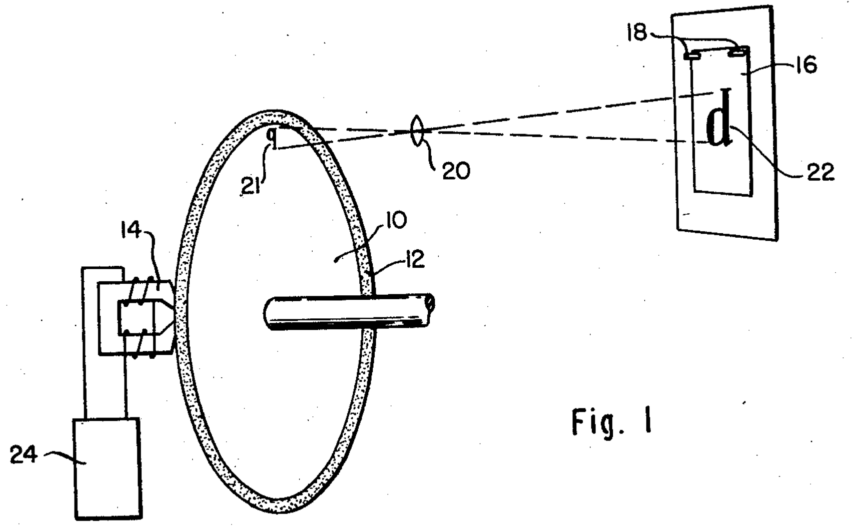
Figure 2:
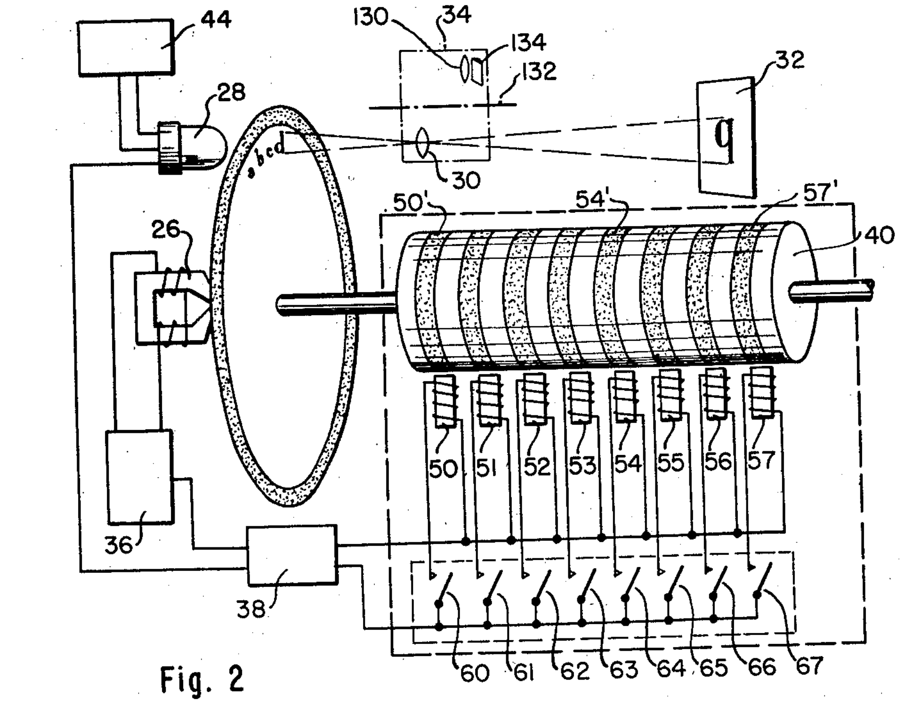
Figure 4:
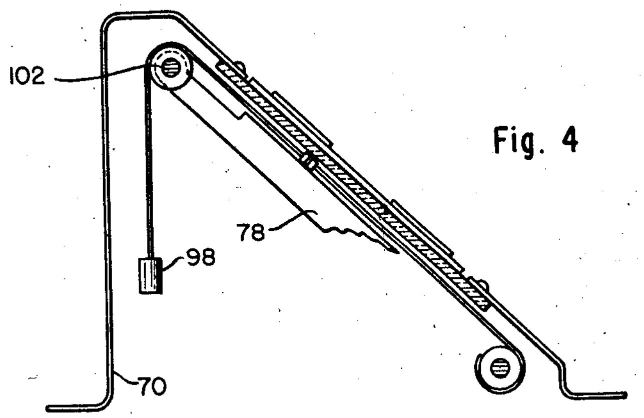
Figure 3:
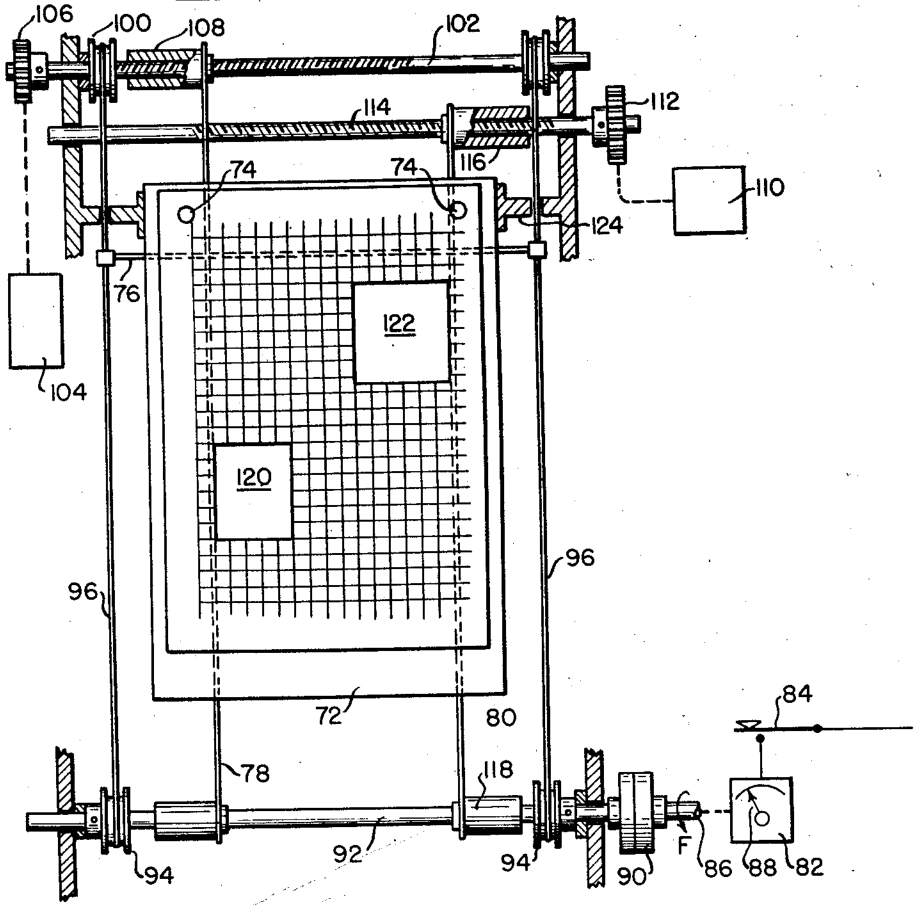
Figure 5:
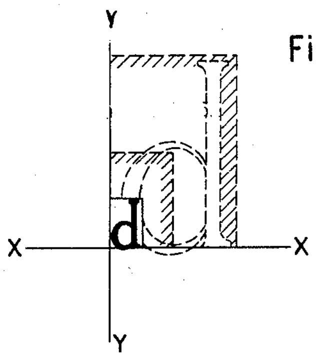
Figure 6:
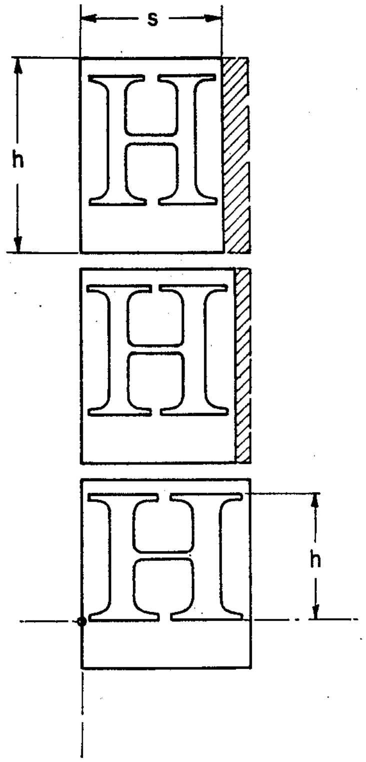

The invention will be described in relation to the embodiments shown in the accompanying drawings in which Fig. 1 is a diagram showing the construction of a control mechanism for the manufacture of a character disk; Fig. 2 is a diagram of a decoder utilizing magnetic means; Figs. 3 and 4 are an indicating device on which the operator may follow the composition of a page; Fig. 5 shows how the matrix characters are arranged with respect to the optical axis of the photographic lens; Fig. 6 shows how characters of different point size are obtained from the same matrices.

In our copending application Serial No. 770,320, we have described a so-called fine or precise control apparatus utilizing photo-electric means associated with the character disc and tending to activate the flash circuit upon the passage of each and every character through projection position. While this precise control circuit thus tends to activate the circuit for each and every character, it is prevented from doing so by a so-called rough control circuit which in combination with the register, keeps the flash control circuit open until a particular selected character comes into photographing position.

According to the present invention, the fine or precise control circuit comprises a magnetic recording device which is shown in Figs. 1 and 2.

Referring to Fig. 1, the master character disc is shown in 10 and may be made of a glass photographic plate. On the periphery of the disc at 12, an extremely thin layer of magnetic particles has been deposited, for example by means of a binder resin. These particles may be of magnetic alloy or of any other suitable magnetic substance such as iron oxide. In front of this magnetic ring, and at a short distance from it, is a recording coil 14 of the type used in the magnetic voice recorders. The matrices of the characters are drawn at a large scale and held in position on a mounting plate 16 by means of, for example, two registering rods 18. A lens 20 makes an image 21 of the character 22 on the photographically sensitized surface of the disc. At the same time as the photograph of the character is made, an electrical impulse is sent into coil 14 by an appropriate circuit shown diagrammatically at 24. This magnetizes the ring 12 locally at a point having an exact angular relationship with the photographic image 21. The same procedure is carried out for each character of the font.

After having been developed, the disc is used in a mounting similar to the one shown in Fig. 2 and comprising a reading coil 26, a discharge tube 28, a lens 30 and the film 32. The lens is mounted in a turret 34, to be referred to later. The disc spins continuously and the coil generates an impulse each time a character passes in photographing position. This impulse, amplified by an amplifier 36, is normally inoperative, being stopped by a gating circuit 38, for example, a vacuum tube appropriately biased. The gating circuit is made conductive by the decoder 40 when the selected character passes in photographing position. The impulse, associated with the selected characters and generated by the passage of a magnetized section of ring 12 opposite coil 26, is then amplified and directed onto the discharge tube 28 which it primes. The supply circuit of the discharge tube is shown schematically in 44.

The decoder 40, instead of being as described in the above-mentioned application, preferably uses magnetic means as shown in Fig. 2. The brushes are replaced by reading coils 50 to 57 cooperating with magnetic bands 50' to 57' on the decoder drum 40. On these magnetic bands are registered signals corresponding to the different code combinations. The reading coils are put in or out of the circuit by switches 60 to 67, respectively, which are controlled by the register. When the magnetic bands of the decoder rotate, a moment arrives, according to the code of the selected character, when there is no signal. The gating circuit 38 then lets pass the positioning impulse generated by coil 26. The details of the register are not shown, nor is the specific form of the amplifier and gating circuit, since said parts will be clear to those skilled in the art, after reference to said application.

The magnetic bands may be of various types. For instance, it is possible to use a layer of magnetic substances and to record on this magnetic layer the different code signals. The code signals can be directly registered or can modulate a high frequency current. In the latter case, a detector is placed at the input of the gating circuit 38.

Figs. 3 and 4 show schematically an indicator which is useful for page make-up in conjunction with our photocomposing equipment.

This indicator comprises a frame 70 provided with a window 72 of transparent material with two registering pins 74. One index 76, made for instance of a thin steel blade, can be moved in parallel fashion and very close to window 72. As shown on the drawing, this index can move upwards and downwards. A second similar index 78, which is perpendicular to the first one, can also be displaced in parallel fashion from left to right and right to left. Finally a third index 80, parallel to 78, can be displaced from right to left and left to right. These three indexes are located as close as possible to the lower surface of the transparent plate 72 so as to be seen clearly from above.

The horizontal index 76 is controlled by a line spacing mechanism shown diagrammatically at 82, and controlled by the end-of-line key 84. The key 84 is closed by the operator after a line is typed on the typewriter and it serves to restore the typewriter carriage into position for typing a new line. It may also be utilized for starting the actual projection on the film of previously composed characters which are stored in the register. For purposes of the present invention the key is shown only as connected to the spacing mechanism 82, which is any convenient form of variable escapement, such as a variablethrow pawl, capable of turning the shaft 86 by any desired amount under the control of the operator, as by means of a manual setting device shown at 88. The shaft is connected through a clutch 90 with a shaft 92 on which are mounted drums 94. These drums are provided with belts or cords 96. When the line spacing mechanism 82 is operated, it causes shaft 92 to rotate in the direction of arrow F, and cords 96 are wound around drums 94, thus causing index 76 to move downwards. The cords 96 are attached at their ends to weights 98 and pass over pulleys 100 which can rotate freely about an upper shaft 102.

The left marginal index 78 is controlled by the left marginal control mechanism indicated diagrammatically by the block 104. This mechanism may be of the form illustrated in Fig. 4 of our application Serial No. 187,752. Upon release of the pulleys 66 and 68 of said application they move to a point to determine the desired space in the line. For purposes of the present invention, they are arranged to provide the desired space at the left. They are connected through a pinion 106 to drive the shaft 102 in the appropriate direction. Part of the length of the shaft is threaded and bears a threaded sleeve or nut 108 attached to one end of the index 78. The other end of this index is provided with a sliding sleeve which can move freely on rod 92. Rotation of shaft 102 will cause a displacement of the index 78.

The right marginal index 80 is controlled by the mechanism for adjusting the length of the justified line. This mechanism is illustrated by the block 110, which is preferably of the form shown at 148, 150, 152, 154 in Fig. 1 of our copending application, Serial No. 187,752. It is connected through a pinion 112 with a threaded shaft 114 which drives a sleeve 116 attached to one end of index 80. The other end of this index is fixed to the guiding sleeve 118 on the shaft 92.

The control mechanism of these three indexes is designed in such a way that: (1) The horizontal index moves downward at the end of the storage of a line by a distance equal to the length by which the film will be moved after the end of the transcription of the said line. (2) Index 78 is controlled by the left hand margin adjustment mechanism. (3) Index 80 moves when the justification is changed so as to always be in a position representing the end of the composed line.

These three indexes enable the operator to see at any instant where the line is which he is composing on the page, where it begins and where it ends.

The manner in which this indicator can be used will now be described. One of the principal advantages of this indicator is the possibility of composing directly full pages while leaving the necessary empty spaces for cuts (figures, mathematical formulae and other illustrations). It also makes it possible to avoid so-called widow lines by warning the operator when this is going to happen and thus enable him to immediately recompose the page or the paragraph with slight changes in the line spacing or the numbers of words in the lines. An example of a page comprising two cuts 120 and 122 will be described. First of all, at the beginning of his work, the operator places on registering pins 74 the transparent sheet 72 provided with vertical lines and calibrated from left to right in justification units (for instance picas); the sheet is also provided with horizontal lines calibrated from top to bottom in line spaces. The cuts to be placed on the page are represented by pieces of paper or of a plastic substance attached to the sheet, and the pieces are of the same size as the cut to be left for the illustrations. These figures can be prepared in advance and are numbered in the order of the illustrations. On the text given to the operator mention is made of the position where the illustrations are to be placed.

At the beginning of the composition of one page, the horizontal index 76 is at rest against an abutment 124. The operator adjusts the left and right hand margins so as to have, between indexes 78 and 80, a distance equal to the desired length of line. Composition of the first line of the page begins. When the operator throws the "end of line" key to bring the platen of the typewriter back and to send a line to the photographic unit, mechanism 88 is operated and displaces downward the index 76 to show the operator where the next line to be composed will be.

The operator then continues the composition until he reaches the area where the cut 122 is to be inserted. He operates the justification control until the index 80 reaches the left hand extremity of piece 122. The operator proceeds to compose the text with this new justification until the index 76 has passed the lower edge of the paper 122. He then returns to the normal justification length for a full line. In the case of cut 120, the procedure is similar except that the operator uses the left hand margin control instead of the justification knob.

The above process makes it possible to provide empty spaces of any shape and at any position on the page, as well as captions under the figures, the folios, footnotes, etc. When the operator has finished composing the last line of the page and when he desires to go on to the next page, he releases clutch 90, and index 76 then comes back against its abutment 124 under the action of the weight 98.

One of the main advantages of photocomposition rests in the possibility of obtaining several point sizes starting from a single character matrix. This result is obtained by enlarging or reducing photographically. To this end, the lens turret 34 in Fig. 2 is provided with a plurality of lenses of different focal lengths, one shown at 30 and another at 130. Any number of different lenses may be provided. The turret is rotatable about an axis 132 to bring the optical axis of any desired lens into coincidence with the projection axis.

However, it is well recognized that best results cannot be generally obtained when using exactly similar characters. In other words, the drawing of a character of small point size cannot be obtained by the simple reduction of a character of larger size. The typecasters have realized the difficulty, and the creation of a family of characters of point sizes 5 to 16 points calls for generally 2 or 3 different drawings serving as a basis for punchcutting.

This is very apparent if the same letter taken in alphabets of different point size is enlarged to the same height *"h"* (Fig. 6). In this figure is shown the result of taking letter "H" of point size 6 (lowest diagram), of point size 10 (middle diagram) and of point size 14 (top diagram). This drawing makes evident the rule of nonproportionality of the characters of different point sizes. A greater legibility is obtained by giving a greater width to characters of small point size with respect to their height. In the same manner, the thickness of the legs is also increased. This rule originated from practice. The widening of the characters does not vary proportionally to the point size but should increase as the point size is reduced.

According to features of the present invention, simple means are used to satisfy the requirements arising from the rules mentioned above. This is obtained by a combination of mechanical and optical means. It will be explained in relation to the process used for making the matrices.

The matrix discs are made by photographic means. The characters are drawn at a large scale on plates or paper 16 (Fig. 1).

Figure 5 shows how the optical axis is located with respect to the matrix character. The position of the character is defined by two axes XX and YY. Axis XX is the base line and axis YY defines the left hand approach. If the characters are photographed in the order of composition, they align on the left hand approach axis line YY. In order to keep the characters in correct position with respect to the left hand margin when the magnification is changed, it is necessary that the optical axis of the projecting lens 20, Fig. 1, intersect the left hand axis YY. If this is not the case when the lens is changed for obtaining characters of larger dimensions, the enlarged character will overlap the left hand margin. The same applies for the alignment defined by axis XX, which the optical axis of the lens must also intersect. It follows that the intersection of axes XX and YY is the point where the optical axis of the projecting lens must intersect the character at the time when the flash of light takes place.

It follows that the characters, when enlarged or reduced by photographic methods always fall in the same upper right quadrant except for letters whose descenders fall into the quadrant immediately below.

In order to produce the changes indicated in Fig. 6 from a single font of characters, the invention provides for optical distortion during transcription. This is most conveniently afforded by cylindrical lenses. Thus, in Fig. 2, there is associated with the lens 130 a cylindrical lens 134. As an example, for the characters of Fig. 6, the spherical lens 30 would be used for the large point size (top diagram) and the combined lenses 130 and 134 for the small point size (bottom diagram), the cylindrical axis being vertical when the lens combination 130, 134 is in projection position. This gives the spreading effect for the smaller point size.

The lenses 130 and 134 may be spaced along the optical axes according to suitable principles of lens design. If desired, a single sphero-cylindrical lens (or lens system) may be used. It will be understood that the spread is relatively small, and that adequate depth of field is attained. The various lens systems provided on the turret will be constructed for the desired magnification and spread of the characters.

The characters are projected one by one on a film in order to compose words. To space the characters the film (or a reflecting surface such as a prism) is advanced after the projection of each character. We shall assume here that the film is advanced and that these advances or steps shall be referred to as the distance "*s*" by which the film must be advanced after each character is projected. The maximum height occupied by the characters including the small margin left above and below to space the lines without interference between "ascending" and "descending" characters will be called point size "*c*." The usual point sizes used in typographic work are 5, 6, 7, 8, 9, 10, 11, 12 and 14 points. As explained above, changing point sizes requires changing the lenses.

According to the present invention, the mechanism for advancing the film provides advances which are not proportional to the point size. If this was not done, the larger the point size the more the characters would be spaced apart one from the other because of the increase in surface, as shown by the hatched portions of Fig. 6.

Figure 5 of our application Serial No. 187,752 shows a mechanism for controlling the film advance. If the characters were exactly proportional in the different sizes, a displacement of the driving racks by a number of teeth equal to the point size could be used; for example, the rack would be displaced by 6 teeth for the point size 6, 10 teeth for the point size 10, etc. According to one feature of the invention, this proportionality is not kept, thus permitting in a simple fashion a variation in the advances corresponding to nonproportional variations of width of characters in different point sizes.

Let us assume that 14 is the largest point size desired from the machine; the procedure is as follows. The drawings of the characters are made so that they have the correct proportions for point size 14 and their advance is made to correspond to a displacement of 14 teeth of the control rack. These master characters are used for making the matrix disc. On the other hand, the advances for the other point sizes are made equal to the corresponding number of teeth plus one, for example. The resulting (or corrected) advances obtained are given in the table below:

| Point Size | Proportional Advances | Advances Corrected By The Addition Of One Tooth | Percent Increase In Advance Of Character |
|---|---|---|---|
| 5 | 5 teeth | 6 teeth | 1/5=20%. |
| 6 | 6 teeth | 7 teeth | 1/6=17%. |
| 7 | 7 teeth | 8 teeth | 1/7=14%. |
| 8 | 8 teeth | 9 teeth | 1/8=12½%. |
| 9 | 9 teeth | 10 teeth | 1/6=11%. |
| 10 | 10 teeth | 11 teeth | 1/10=10%. |
| 11 | 11 teeth | 12 teeth | 1/11=9%. |
| 12 | 12 teeth | 13 teeth | 1/12=8½%. |
| 14 | 14 teeth | 14 teeth | 0=0%. |

According to this table, the ratio of the difference between the corrected and the proportional advance for a given point size to the proportional advance is greater for small point sizes, which conforms with the desired results. For example, between point size 6 and point size 5 the increase is 3% but only ½% between point sizes 12 and 11.

The bold characters generally require a greater advance than the corresponding roman characters. This may be obtained by increasing the displacement of the control rack by advancing it "*n*" supplementary teeth. The increase of advance *a* is then $$a=\frac{n}{c}$$

in which *c* represents the proportional advance (or for example the point size). The advantage of such a system, for a given point size is the increase of the advance proportional to the width of the character. The real advance, that is the space reserved for a character on the film is given by the equation $s=u(n+d)$ where "*u*" is the number of elementary units contained in the character, this quantity characterizing the relative width of the character (for example, i=5 units; b=10 units; w=13 units; m=15 units; etc.) independently of the point size. "*n*" represents the number of additional teeth by which the control rack is advanced and "*d*" represents the proportional advance or the point size, corrected as indicated by the table. By way of example, consider characters "i" and "m" composed in point size 11 ($d=12$). For roman, characters taking $n=1$, for "i" we have $s=5(1+12)=65$ elementary units of width. For a roman "m" we have $s=15(1+12)=195$ elementary width units. On the other hand, for bold characters, taking $n=2$, we have for "i" $s=5(2+12)=70$ and for "m" $s=15(2+12)=210$. In comparing these results with those given above we find that the increase in advance for "i" is 5 supplementary units while it is 15 units for "m."

It is clear that, although the given examples refer only to the increase in the proportional advance for smaller point size or bold characters, a reverse distortion can be chosen, for example for obtaining condensed characters. In the same way the ordinary advance used for roman characters can be reduced for italic characters by decreasing the extent of the movement of the control rack.

Although the present invention has been shown and described in relation to particular embodiments, it is clear that these embodiments can be modified without departing from the field of the invention.

Having thus described the invention, we claim:

In a photographic type composing machine, the combination of means for placing the selected characters in a line of type successively in a projection position, said characters being of uniform point size, a support for a sensitized sheet, and a plurality of lens systems selectively movable to a position to focus an image of a character in the projection position upon said sheet, said projection position being so located that the base line and a line through one of the side approaches of each character therein intersect in the optical axis of the selected lens system, there being a lens system for each available projected point size, each system including a spherical element, and at least one system including spherical and cylindrical elements in fixed relation.

References Cited in the file of this patent

UNITED STATES PATENTS

| | | |
|---|---|---|
| 1,691,281 | Graves | Nov. 13, 1928 |
| 1,987,635 | Poeppelmeier | Jan. 15, 1935 |
| 2,010,561 | Ogden | Aug. 6, 1935 |
| 2,026,330 | Tauschek | Dec. 31, 1935 |
| 2,084,450 | Paris | June 22, 1937 |
| 2,184,223 | Horman | Dec. 19, 1939 |
| 2,200,203 | Heintz | May 7, 1940 |
| 2,228,782 | Sharples | Jan. 14, 1941 |
| 2,314,272 | Grudin | Mar. 16, 1943 |
| 2,371,120 | Blakely | Mar. 6, 1945 |
| 2,421,656 | Smith | June 3, 1947 |

FOREIGN PATENTS

| | | |
|---|---|---|
| 407,965 | Germany | Jan. 6, 1925 |
| 826,134 | France | Dec. 27, 1937 |
| 506,635 | Great Britain | May 30, 1939 |